(12) United States Patent
Carrieres

(10) Patent No.: US 10,072,732 B2
(45) Date of Patent: Sep. 11, 2018

(54) GEAR WITH OPTIMIZED GEAR WEB SHAPE

(71) Applicant: Pratt & Whitney Canada Corp., Longueuil (CA)

(72) Inventor: Alain Carrieres, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 893 days.

(21) Appl. No.: 14/547,638

(22) Filed: Nov. 19, 2014

(65) Prior Publication Data

US 2016/0138677 A1 May 19, 2016

(51) Int. Cl.
| | |
|---|---|
| *F16H 1/08* | (2006.01) |
| *F01D 25/16* | (2006.01) |
| *F02C 7/36* | (2006.01) |
| *F16H 55/17* | (2006.01) |

(52) U.S. Cl.
CPC ............. *F16H 1/08* (2013.01); *F01D 25/164* (2013.01); *F02C 7/36* (2013.01); *F16H 55/17* (2013.01); *F05D 2260/4031* (2013.01)

(58) Field of Classification Search
CPC ... F05D 2260/4031; F05D 2260/40311; F02C 7/36; F02C 7/32; F02C 3/107; F02C 3/113; F16H 55/17; F16H 1/08; F01D 25/164; F01D 25/16
USPC .......................................................... 74/640
See application file for complete search history.

(56) References Cited

U.S. PATENT DOCUMENTS

| | | | |
|---|---|---|---|
| 2,207,290 A | * | 7/1940 | Hale ....................... F16H 55/14 301/63.101 |
| 2,281,898 A | | 5/1942 | Whitten |
| 3,183,731 A | | 5/1965 | Dolza |
| 3,371,549 A | | 3/1968 | Schrempp |
| 3,406,583 A | | 10/1968 | Baier |
| 3,837,178 A | | 9/1974 | Hackforth et al. |
| 3,903,690 A | | 9/1975 | Jones |
| 4,541,296 A | | 9/1985 | Oyafuso |
| 4,635,501 A | * | 1/1987 | Mizuno ................... F16H 55/14 74/433.5 |
| 4,831,897 A | | 5/1989 | Dobbs |
| 5,107,676 A | | 4/1992 | Hadaway et al. |
| 5,219,314 A | | 6/1993 | Her et al. |
| 5,606,890 A | | 3/1997 | Luckas |
| 6,122,985 A | | 9/2000 | Altamura |
| 6,647,818 B1 | | 11/2003 | Takeuchi et al. |
| 6,684,729 B2 | | 2/2004 | Bauseler |

(Continued)

FOREIGN PATENT DOCUMENTS

GB 820430 A * 9/1959 ............. F01D 25/16

*Primary Examiner* — Logan Kraft
*Assistant Examiner* — Joshua R Beebe
(74) *Attorney, Agent, or Firm* — Norton Rose Fulbright Canada LLP

(57) ABSTRACT

A gear comprises gear teeth. An annular web has the gear teeth on an external surface thereof and rotatable about a rotational axis of the gear. The web comprises a wall having at least a first axial surface and a second axial surface on the opposite side of the wall. The web defined by a first web section in which the first axial surface, in an inward direction, inclines away from a radial plane to which the rotational axis is normal, a second web section radially inward of the first web section, and in which the first axial surface, in the inward direction, inclines toward said radial plane.

20 Claims, 2 Drawing Sheets

(56) References Cited

U.S. PATENT DOCUMENTS

| | | |
|---|---|---|
| 8,201,389 B2 | 6/2012 | Eleftheriou et al. |
| 2003/0115885 A1* | 6/2003 | MacFarlane ............ F02C 6/206 60/793 |
| 2008/0173119 A1* | 7/2008 | Suzuki ................ B29C 45/0025 74/459.5 |
| 2012/0312115 A1* | 12/2012 | Kunz ..................... F16H 55/17 74/412 R |
| 2014/0155219 A1* | 6/2014 | McCune ................ F01D 15/12 475/331 |

* cited by examiner

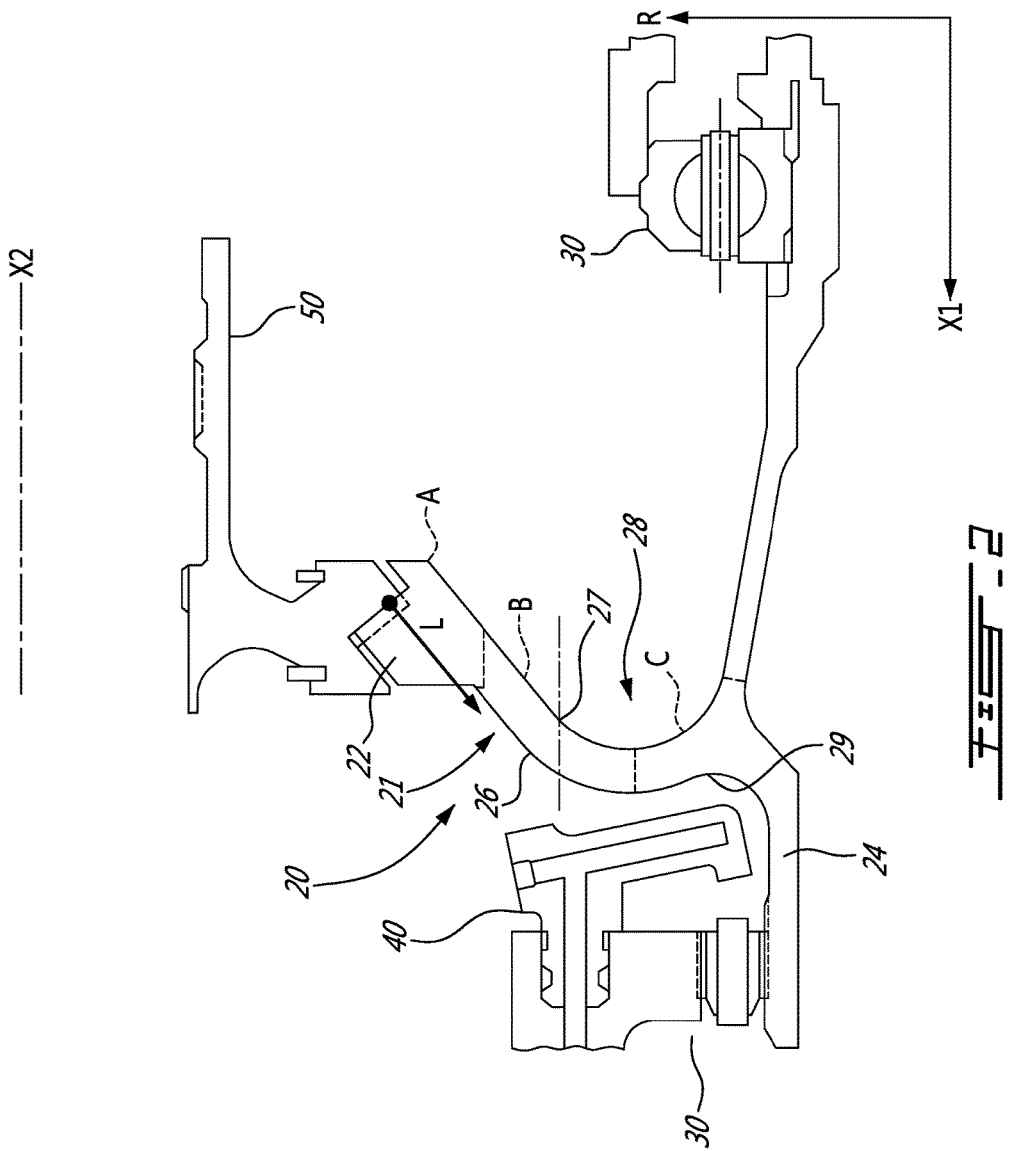

GEAR WITH OPTIMIZED GEAR WEB SHAPE

TECHNICAL FIELD

The present application relates to gears, for instance of the type used in gas turbine engines and like motorization.

BACKGROUND OF THE ART

Many output gears typically have a relatively large diameter, which may render them flexible. In some instances, output gears are subjected to axial loads because of the orientation of their teeth. For instance, in the case of helical gears, the meshing with a mating gear may often result in axial loads during operation. Additionally, due to the high torque of some applications, such gears are exposed to substantial non radial loads, such as in turboprop engines featuring axially offset shafts. Therefore, different web shapes have been devised in order to reduce tooth deflection.

One such configuration features a generally frustoconical web, however, such a configuration requires space available to accommodate this shape. For instance, there may be oil nozzles or other components in the vicinity of the gear which restrict the design options available.

SUMMARY

In accordance with the present disclosure, there is provided a gear comprising: gear teeth; an annular web having the gear teeth on an external surface thereof and rotatable about a rotational axis of the gear, the web comprising a wall having at least a first axial surface and a second axial surface on the opposite side of the wall, the web defined by at least: a first web section in which the first axial surface, in an inward direction, inclines away from a radial plane to which the rotational axis is normal; and a second web section radially inward of the first web section, and in which the first axial surface, in the inward direction, inclines toward said radial plane.

Further in accordance with the present disclosure, there is provided a gear set comprising: a first gear having external gear teeth; and a second gear in operative meshing engagement with the first gear for transmission of rotational movement from one to another, whereby a load results on the second gear, the second gear comprising: gear teeth on an external surface thereof; an annular web having the gear teeth on an external surface thereof and rotatable about a rotational axis of the second gear, the web defined by at least: a first web section inclining away, in an inward direction, from a radial plane to which the rotational axis is normal, the first web section being generally aligned with said load; and a second web section radially inward of the first web section and inclining toward said radial plane in the inward direction.

Further details of these and other aspects of the present invention will be apparent from the detailed description and figures included below.

DESCRIPTION OF THE DRAWINGS

Reference is now made to the accompanying figures, in which:

FIG. 2 is a section view of a gear for instance as found in the gas turbine engine of FIG. 1.

DETAILED DESCRIPTION

Figure 1:
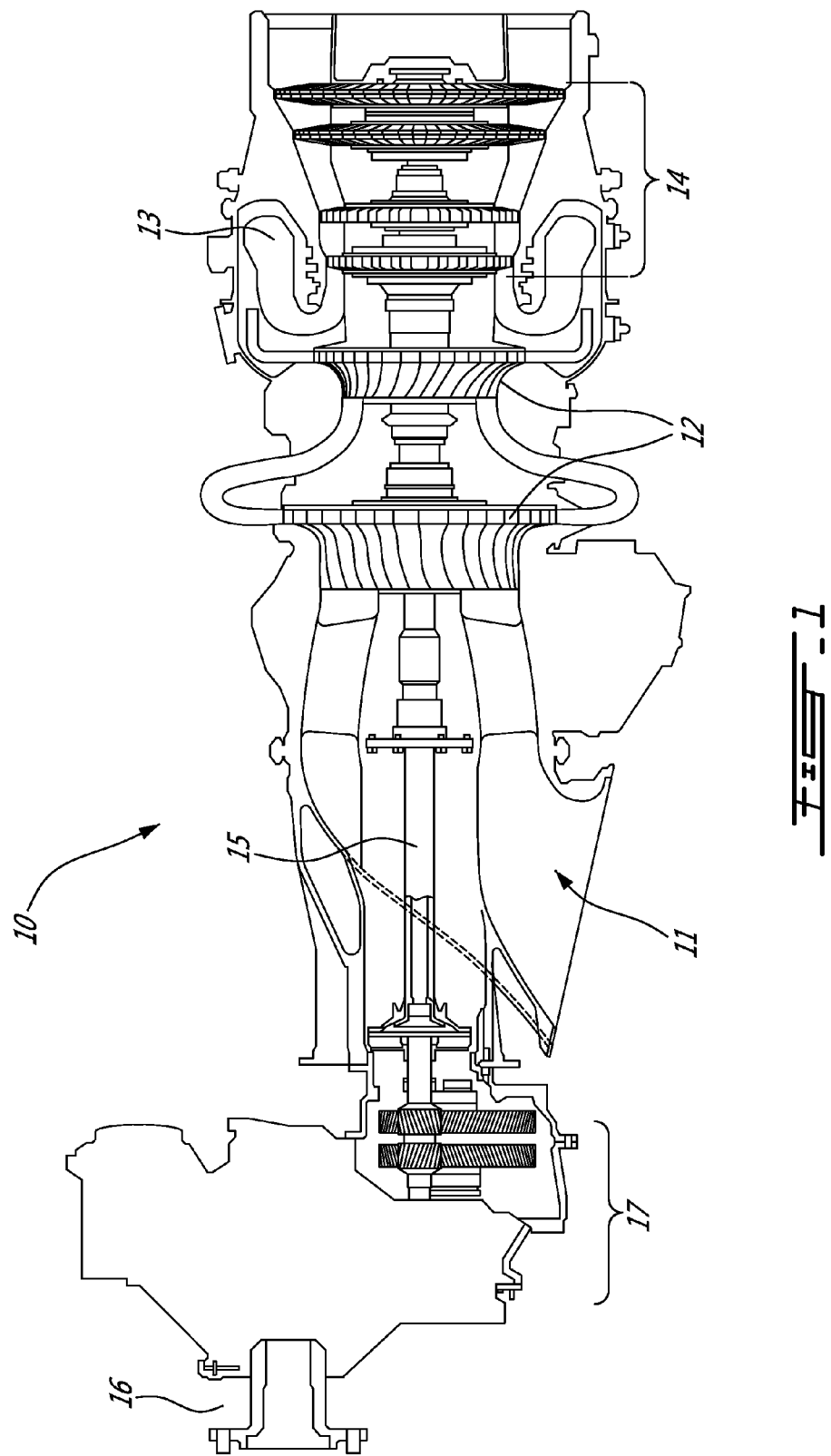
FIG. 1 is a schematic cross-sectional view of a turboprop gas turbine engine.

FIG. 1 illustrates a gas turboprop engine 10 of a type preferably provided for use in subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbines 14. A power shaft 15 connected to one of the turbines 14 projects forwardly to transmit a driving force to a propeller shaft 16 via a reduction gearbox generally shown at 17.

Referring to FIG. 2, there is illustrated a gear at 20. The gear 20 may be part of the reduction gear box 17 of the turboprop engine 10 (FIG. 1), as a contemplated use. Multiple other uses of the gear 20 are considered, for instance at other locations in a gas turbine engine. FIG. 2 shows a sectional view of the gear 20. Accordingly, the numerous components of the gear 20 are of annular shape, as the gear 20 rotates about axis X1 (representing the axial direction), with the components of the gear 20 also extending in radial direction R, i.e., a radial plane to which the rotational axis X1 is normal.

The gear 20 is rotatably supported by bearings 30. Although a pair of bearings 30 is shown, more or less bearings 30 may be provided to rotatably support the gear 20.

In the vicinity of one of the bearings 30 is located an environing component, such as oil nozzle 40. The presence of oil nozzle 40 is circumstantial to the use of the gear 20—there may be no component at that location.

A mating gear is generally shown at 50 and is in meshing engagement with the gear 20. According to an embodiment, the gear 20 is a helical gear and the mating gear 50 is a corresponding helical gear, whether it be in a parallel configuration as shown in FIG. 2, cross configuration, etc with the helical gear 20. Other types of gears and configurations are considered as well. The mating gear 50 is axially offset, in that its rotational axis X2 is parallel and non-coaxial with rotational axis X1.

The gear 20 has an annular web 21 with gear teeth 22 thereon (i.e., cogs) at a circumference of the gear 20. The gear teeth 22, while not being annular, are circumferentially distributed along the circumference of the annular web 21, to form the outer radial surface of the gear 20, also known as external surface. The gear teeth 22 may have any appropriate orientation. According to an embodiment, the teeth 22 are not parallel to the axis of rotation (X1) but are set at an angle, for instance in a helical gear configuration for the gear 20. During operation, the gear 20 is subjected to a load L as a result of its interaction with mating gear 50. The direction of load L is approximately shown in FIG. 2, but may result from the orientation of the teeth 22 and those of the mating gear 50.

The gear 20 further comprises a shaft 24 by which the gear 20 is supported by bearings 30. The shaft 24 may be referred to as a hub, an axle, etc., and is essentially regarded as a more central portion of the gear 20 by which it is rotatably supported, whether directly or indirectly, by components such as the bearings 30. In FIG. 2, the shaft 24 is fragmented, and may thus have a longer body. In an embodiment, as shown in FIG. 2, the web 21, teeth 22 and shaft 24 form an integral monolithic component. However, the web 21 may be distinct from the shaft 24 and connected to it, for instance by fasteners, welding, brazing, etc.

In a radially inward direction—from radially outermost to radially innermost—, the web 21 has a sequence of a root section A, a load-direction inclined section B, and an opposite inclined section C. These sections A, B and C are axially delimited by a first annular surface 26 and a second annular surface 27 of the web 21. The first annular surface 26 and the second annular surface are generally smooth and continuous, i.e., without projecting edges, and merge with the shaft 24, for instance with a fillet like transition, as shown for the first annular surface 26.

The root section A consists in an enlarged portion relative to a sections B and C, the root section A supporting the teeth 22. By having this root support section A of enlarged dimension, the umbrella effect and gear bending stresses may be reduced. The enlargement comparatively to the sections B and C of the web 21 may include some flaring from section B to reach a maximum axial width, although other geometries are considered as well. Section A is said to be enlarged as it has a greater width in the axial direction of the web 25, i.e., the width being parallel to axis X.

The load-direction inclined section B is not substantially radial, as the first annular surface 26 and the second annular surface 27 are mostly oblique relative to radial direction R, with both surfaces 26 and 27 being mostly aligned with the axial force L sustained by the gear 20. The surfaces 26 and 27 may curve into reaching the opposite inclined section C, with the radial direction R being tangential to the surfaces 26 and 27 at or near the transition of the load-direction inclined section B with the opposite inclined section C. The section B is inclined in the first axial direction or, as stated differently, inclines away from the radial plane in an inward direction.

The opposite inclined section C is inclined in the second axial direction, i.e., in the opposite direction than the load-direction inclined section B. As stated differently, the opposite inclined section C inclines toward the radial plane in an inward direction, after the web inclined away from the radial plane in the load-direction inclined section B. More specifically, the first annular surface 26 and the second annular surface 27 are mostly oblique relative to radial direction R, but with an axial component in the opposite direction. Accordingly, there results an annular concavity 28 in the second surface 27 caused by the sequence of the load-direction inclined section B and the opposite inclined section C. As the first surface 26 and the second surface 27 may be oriented in the same axial direction for the opposite inclined section C as in FIG. 2, there results an additional annular concavity 29, radially inward of the annular concavity 28. Other arrangements are considered, for instance by having the first surface 26 parallel to the radial direction R in the section C. As another possibility, the opposite inclined section C may flare in a radially inward direction, as observed from FIG. 2, as the inclined section C transitions into the shaft 24.

The configuration of the web 21 optimizes the use of the axial space considering the presence of environing components such as oil nozzle 40. Moreover, the configuration of the web 21 may cause a reduction of the radial deflection of the gear teeth 22 compared to conventional straight inclined webs. Because of the reduced deflection, the stress level in the web 21 and in the root section A may be reduced. Moreover, the load distribution along the gear teeth 22 may be improved by being more uniform and is more neutral to the direction of misalignment with the mating gear 50 in comparison to conventional inclined straight web shape.

Stated differently, the web section B inclines inwardly away from a radial plane defined by the teeth 22, and the web section C connected to and radially inward of the web section B inclines inwardly back towards the radial plane of the teeth 22, the web having an inflection point between the sections B and C.

The above description is meant to be exemplary only, and one skilled in the art will recognize that changes may be made to the embodiments described without departing from the scope of the invention disclosed. For example, bevel gears could benefit from the optimized web shape described above. The gear 20 may also be part of a turbo-shaft gas turbine engine. The load-direction inclined section B may be regarded as a frustoconical portion, while the opposite inclined section C may be regarded as an inverted frustoconical portion in the opposite direction, or a countersink in the frustoconical portion defined by the load-direction inclined section B. Still other modifications which fall within the scope of the present invention will be apparent to those skilled in the art, in light of a review of this disclosure, and such modifications are intended to fall within the appended claims.

The invention claimed is:

1. A gear comprising:
   gear teeth, the gear teeth being non-parallel to a rotational axis of the gear, whereby a direction of a load received by the gear is oblique relative to a radial direction of the gear, the gear teeth located between radial planes to which the rotational axis is normal;
   an annular web having the gear teeth on an external surface thereof and rotatable about the rotational axis of the gear, the web comprising a wall having at least a first axial surface and a second axial surface on the opposite side of the wall, the web defined by at least:
   a first web section in which the first axial surface, in an inward direction, inclines away from the radial planes, the first axial surface being generally aligned with said direction of the load; and
   a second web section radially inward of the first web section, and in which the first axial surface, in the inward direction, inclines toward said radial planes, wherein a transition between the first web section and the second web section is axially spaced from the radial planes.

2. The gear according to claim 1, wherein the web further comprises another web section between the first web section and the gear teeth, the other web section having a greater thickness in the axial direction than the first web section and the second web section.

3. The gear according to claim 2, wherein the gear teeth are monolithically integral with the other web section.

4. The gear according to claim 1, wherein the first surface and the second surface are smooth and continuous at least in the first web section and the second web section.

5. The gear according to claim 1, wherein the first surface defines a curved concavity with the first web section and the second web section, an intersection between the first web section and the second web section being tangential to the radial plane.

6. The gear according to claim 1, wherein, in the first web section, the second axial surface inclines away from the radial plane in an inward direction.

7. The gear according to claim 6, wherein, in the second web section, the second axial surface inclines toward said radial plane in the inward direction.

8. The gear according to claim 7, further comprising one of a shaft and a hub inward of the web, and a fillet at a junction between the second axial surface and the shaft or hub.

9. The gear according to claim 1, wherein the gear teeth form a helical gear.

10. The gear according to claim 1, further comprising one of a shaft and a hub inward of and connected to the second web section, a junction between the second web section and the shaft or hub being axially spaced from the radial planes.

11. A gear set comprising:
A first gear having external gear teeth; and
A second gear in operative meshing engagement with the first gear for transmission of rotational movement from one to another, whereby a load results on the second gear, the second gear comprising:
Gear teeth on an external surface thereof, the gear teeth being non-parallel to the rotational axis of the second gear, a direction of a load received by the second gear being oblique relative to a radial direction of the second gear, the gear teeth located between radial planes to which the rotational axis is normal;
A first web section inclining away, in an inward direction and a first axial direction, the first web section being generally aligned with said load; and
A second web section radially inward of the first web section and inclining in an axial direction opposite to the first axial direction in the inward direction;
Wherein a transition between the first web section and the second web section is axially spaced from the radial planes.

12. The gear set according to claim 11, wherein the web further comprises another web section between the first web section and the gear teeth, the other web section having a greater thickness in the axial direction than the first web section and the second web section.

13. The gear set according to claim 12, wherein the gear teeth are monolithically integral with the other web section.

14. The gear set according to claim 11, wherein surfaces of the first web section and the second web section are smooth and continuous.

15. The gear set according to claim 11, comprising a curved concavity defined with the first web section and the second web section, an intersection between the first web section and the second web section being tangential to the radial plane.

16. The gear set according to claim 11, further comprising one of a shaft and a hub inward of the web, and a fillet at a junction between the second axial surface and the shaft or hub.

17. The gear set according to claim 11, wherein the gear teeth form a helical gear.

18. The gear set according to claim 11, wherein a rotational axis of the first gear is axially offset relative to the rotational axis of the second gear.

19. A gas turbine engine comprising a gear set according to claim 11.

20. The gear set according to claim 11, further comprising one of a shaft and a hub inward of and connected to the second web section, a junction between the second web section and the shaft or hub being axially spaced from the radial planes.

* * * * *